(12) United States Patent
Kuzmin et al.

(10) Patent No.: US 7,039,902 B2
(45) Date of Patent: May 2, 2006

(54) MECHANISM FOR ENABLING EFFICIENT TESTING OF A SET OF COMPUTER CODE

(75) Inventors: Aleksandr M. Kuzmin, Santa Clara, CA (US); Igor V. Kaloshin, Saint-Petersburg (RU)

(73) Assignee: Sun Microsystems, Inc., Palo Alto, CA (US)

(*) Notice: Subject to any disclaimer, the term of this patent is extended or adjusted under 35 U.S.C. 154(b) by 583 days.

(21) Appl. No.: 10/164,820

(22) Filed: Jun. 6, 2002

(65) Prior Publication Data

US 2003/0229889 A1 Dec. 11, 2003

(51) Int. Cl.
*G06F 9/44* (2006.01)
(52) U.S. Cl. .................... 717/126; 717/127
(58) Field of Classification Search ........ 717/124–128, 717/130
See application file for complete search history.

(56) References Cited

U.S. PATENT DOCUMENTS

| | | | | | |
|---|---|---|---|---|---|
| 5,313,616 | A | * | 5/1994 | Cline et al. | 717/127 |
| 5,615,333 | A | * | 3/1997 | Juettner et al. | 714/38 |
| 5,778,169 | A | * | 7/1998 | Reinhardt | 714/38 |
| 5,933,640 | A | * | 8/1999 | Dion | 717/132 |
| 6,292,934 | B1 | * | 9/2001 | Davidson et al. | 717/158 |
| 6,523,169 | B1 | * | 2/2003 | Glunz | 717/124 |

OTHER PUBLICATIONS

T. Ball, "On the Limit of Control Flow Analysis for Regression Test Selection", 1998, ACM, p. 134-142.*
Jones, et al., "Visualization of Test Information to Assist Fault Localization", 2002, ACM, p. 467-477*
Pavlopoulou, et al., "Residual Test Coverage Monitoring", 1999, ACM, p. 277-284.*
Mayrhauser, et al., "CASE Tool Architecture for Knowledge-Based Regression Testing", 1993, ACM, p. 368-378.*

* cited by examiner

*Primary Examiner*—Wei Y. Zhen
*Assistant Examiner*—Qamrun Nahar
(74) *Attorney, Agent, or Firm*—Hickman Palermo Truong & Becker, LLP; Bobby K. Truong

(57) ABSTRACT

A mechanism is disclosed for enabling efficient testing of a set of computer code. Untested code portions within a body of code are determined, and testing priorities are assigned to untested code portions according to how frequently the untested code portions are likely to be invoked during normal operation. More frequently invoked untested code portions are ranked higher than less frequently invoked untested code portions. The prioritized data may be used by a testing team to determine which additional tests should be created for effective and efficient testing of the body of code.

10 Claims, 4 Drawing Sheets

MECHANISM FOR ENABLING EFFICIENT TESTING OF A SET OF COMPUTER CODE

FIELD OF THE INVENTION

This invention relates generally to computer systems, and more particularly to a mechanism for enabling efficient testing of a set of computer code.

BACKGROUND

Computer source code is typically written using a high level computer language. Examples of high level languages include C++, JAVA, FORTRAN, etc. Once written, source code is converted into object or machine code, which can be executed by a computer. A computer program called a compiler program receives as input source code and generates as output object code which may be loaded into the computer memory and executed.

Often, the source code will contain "bugs". Bugs are logical errors in the original source code that cause unexpected results during the execution of the object code. These unexpected results may cause the computer executing the object code to generate unintended output and erroneous data, or to terminate prematurely.

Before releasing any set of computer code, software manufacturers test their code rigorously. Ideally, every set of code should be 100% tested prior to release so that once released, the computer code will not experience any errors. From a practical standpoint, however, this is extremely difficult if not impossible. To do so would require more resources (both in terms of human resources and actual costs) than would be practicable to expend. As a result, most manufacturers settle for a compromise. So long as the testing of a set of code has reached a certain threshold (e.g. 85% of the code has been executed and tested), the code is deemed ready for release.

To determine whether a set of code has been sufficiently tested, manufacturers generally run tests on the code, and generate test coverage data based upon the tests. Basically, the coverage data specifies which lines of source code were executed during the tests, and what percentage of the lines of source code were actually executed and tested. Based upon the coverage data, the manufacturer determines whether the set of code has been sufficiently tested.

Currently, software tests locate untested portions of code, and subsequent tests are created to test some of these portions. However, current methods employ a "smoke" approach, whereby tests are created for randomly selected untested sets of code. This process is very inefficient, usually results in a small incremental increase in the total amount of code tested and is ineffective for debugging a body of code.

Because of the shortcomings of the current methods, there exists a need for an improved mechanism which enables computer code to be tested more efficiently.

SUMMARY OF THE INVENTION

It is observed that the current methodologies test untested portions of a body of code in an inefficient and ineffective manner. To overcome this problem, in one embodiment, the untested code portions within a body of code are determined, and testing priorities are assigned to at least some of the untested code portions. When assigning testing priorities, the untested code portions are ranked based upon how frequently the untested code portions are likely to be invoked during normal operation. More frequently invoked untested code portions are ranked higher than less frequently invoked untested code portions.

In one embodiment, when assigning testing priorities, a particular untested code portion is selected. It is then determined whether the particular untested code portion is part of a core portion of the body of code. In response to a determination that the particular untested code portion is part of a core portion of the body of code, the particular untested code portion is assigned a higher priority. In response to a determination that the particular untested code portion is not part of a core portion of the body of code, the particular untested code portion is assigned a lower priority.

In determining whether the particular untested code portion is part of a core portion of the body of code, the particular code portion is associated with an object class. It is then determined whether the object class is a core object class within the body of code.

In another aspect, when assigning testing priorities, a particular untested code portion is selected and associated with a method. An accessibility parameter for the method is determined, and a priority to the particular untested code portion is assigned based upon the accessibility parameter. A higher priority is assigned to the untested code portion if the accessibility parameter indicates that the method is a public method. A lower priority is assigned to the untested code portion if the accessibility parameter indicates that the method is a private method.

Prioritization of untested portions of code is advantageous over prior approaches because it finds the untested portions with the most potential impact in the body of code. By identifying, and hence enabling, a user to test portions with the most potential impact, maximum benefit is derived for each testing effort. Thus, testing time is used more efficiently.

DETAILED DESCRIPTION OF EMBODIMENT(S)

Background Information

Before describing the invention in detail, a short discussion of some background information will first be provided in order to facilitate a complete understanding of the invention.

Figure 1:
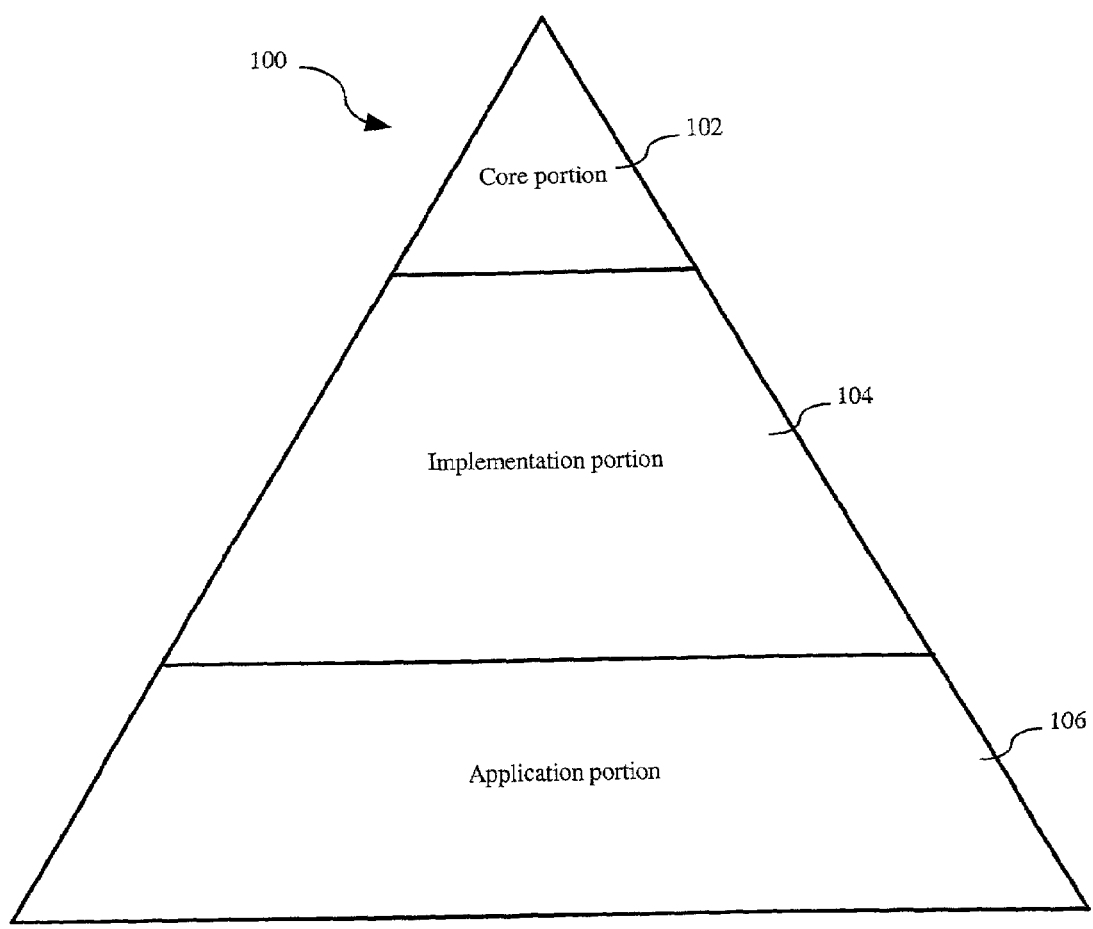
FIG. 1 illustrates a sample body of code in accordance with one embodiment of the present invention.

FIG. 1 illustrates a sample body of code. In FIG. 1, there is shown a representation of an application programming interface (API) stack 100 comprising a plurality of object classes and implementation levels used to develop applications. The API stack 100 is divided into hierarchical levels. At the bottom of this pyramidal stack is the application portion 106. Above this portion is the implementation portion 104 and at the top of the pyramid is the core portion 102 of code. The code in the application portion 106 of the API stack 100 may access code in the application portion 106, the implementation portion 104 and the core portion 102. Code in the implementation portion 104 may access code in the implementation portion 104 and the core portion 102.

Code in the core portion 102 may access other code in the core portion 102. Code in the core portion 102 does not access code in the other portions 104, 106.

In this representation, the higher up in the pyramid a set of code resides, the more basic the function, and the greater the effect it might have on the overall body of code. Therefore, if an error is fixed in the core portion 102 of the stack, higher coverage percentage may be reached more efficiently because the new tests developed for the higher priority object class may also fix errors in the implementation portion 104 and application 106 portion.

During quality assurance testing, the body of code embodied in the API stack is tested and analyzed using one or more tests. For example, the code may be tested using a code coverage analyzer. After a set of tests are run on a body of code, the code coverage analyzer generates information indicating which lines of source code were tested and which lines were not tested. Based on the code coverage information, additional tests for the untested portions may be created by a testing team to increase test coverage. However, using prior approaches, untested portions are selected randomly throughout the body of code for subsequent testing. Such an approach is costly, inefficient and only improves overall testing effectiveness in small increments.

Functional Overview

Figure 2:
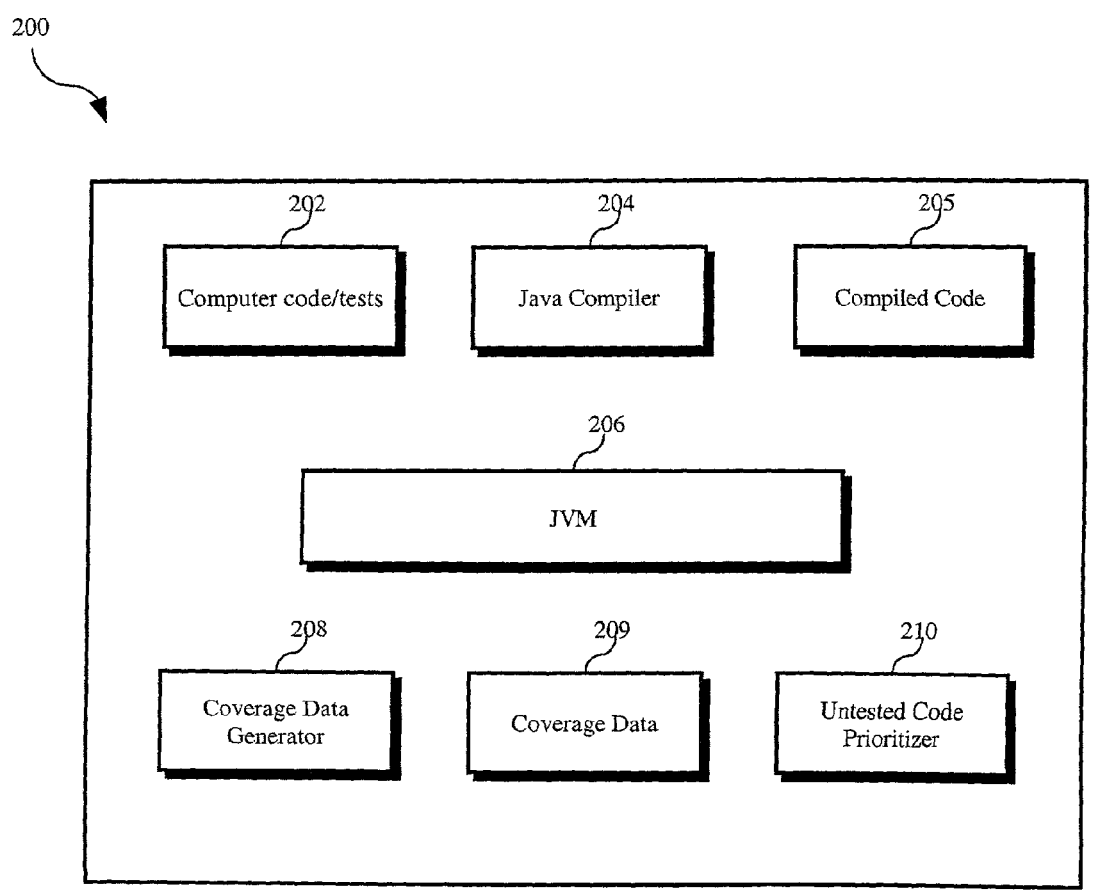
FIG. 2 is a functional block diagram of a system in which one embodiment of the present invention may be implemented.

With reference to FIG. 2, there is shown a functional block diagram of a sample system in which one embodiment of the present invention may be implemented. In the following discussion, for the sake of illustration, the invention will be described in the context of a Java-based environment. However, it should be noted that the invention is not so limited, but rather may be implemented in any system or any environment in which it is desirable to test untested sets of code.

As shown in FIG. 2, the sample system 200 comprises a set of computer code/tests 202, a Java compiler 204, a Java virtual machine ("JVM") 206 and a coverage data generator 208. In one embodiment, the code/tests 202 take the form of Java source code, and represent the computer code that is to be tested and the tests that are to be run on the computer code.

The computer code/tests 202, or source code, is compiled by the Java compiler 204 to derive a set of compiled code 205. It is the compiled code 205 that is actually executed by the JVM 206 during runtime. After the source code is compiled to derive the compiled code 205, the compiled code 205 is executed by the JVM 206 to implement the logic of the source code. After the code execution is complete, the coverage data generator 208 uses information obtained during the execution to determine which lines of source code were executed and which lines were not executed. Once generated, the coverage data 209 may be used to generate a report which may be used to determine whether the source code has been sufficiently tested.

An untested code prioritizer 210 thereafter processes the coverage data 209 to determine which code portions have not been tested. The prioritizer 210 selects an untested code portion and prioritizes the portion according to how frequently it is likely to be invoked during normal operation. First, the untested code portion is associated with an object class. Then, the prioritizer 210 determines whether the object class belongs in the core portion 102 of the API 100. If so, then the untested code portion is assigned a higher priority. If not, the untested portion is assigned a lower priority.

Further, the untested code portion is associated with a method. An accessibility parameter is determined for the method. For example, the accessibility parameters include public, private, protected and package visible. Based upon the accessibility parameter, a priority is assigned to the untested code portion. A higher priority is assigned to the untested code portion if the accessibility parameter indicates that the method is a public or protected method. If the accessibility parameter indicates that the method is a private or package visible method, then a lower priority is assigned to the untested code portion.

Further, it is determined whether the untested code portion is an entire method or a block within a method. A higher priority is assigned to the untested code portion if it is an entire method and a lower priority if it is a block within a method.

After the untested code portion is prioritized, the prioritizer selects another untested code portion and repeats the process. In one embodiment, this continues until all of the untested code portions have been prioritized to generate a set of prioritization data. Once generated, this data may be used by a testing team to determine which of the untested code portions should be tested next for effective and efficient testing of the body of code.

Sample Operation

To overcome the shortcomings of current methodologies, one embodiment of the present invention prioritizes untested code according to its impact within the body of code.

Figure 3:
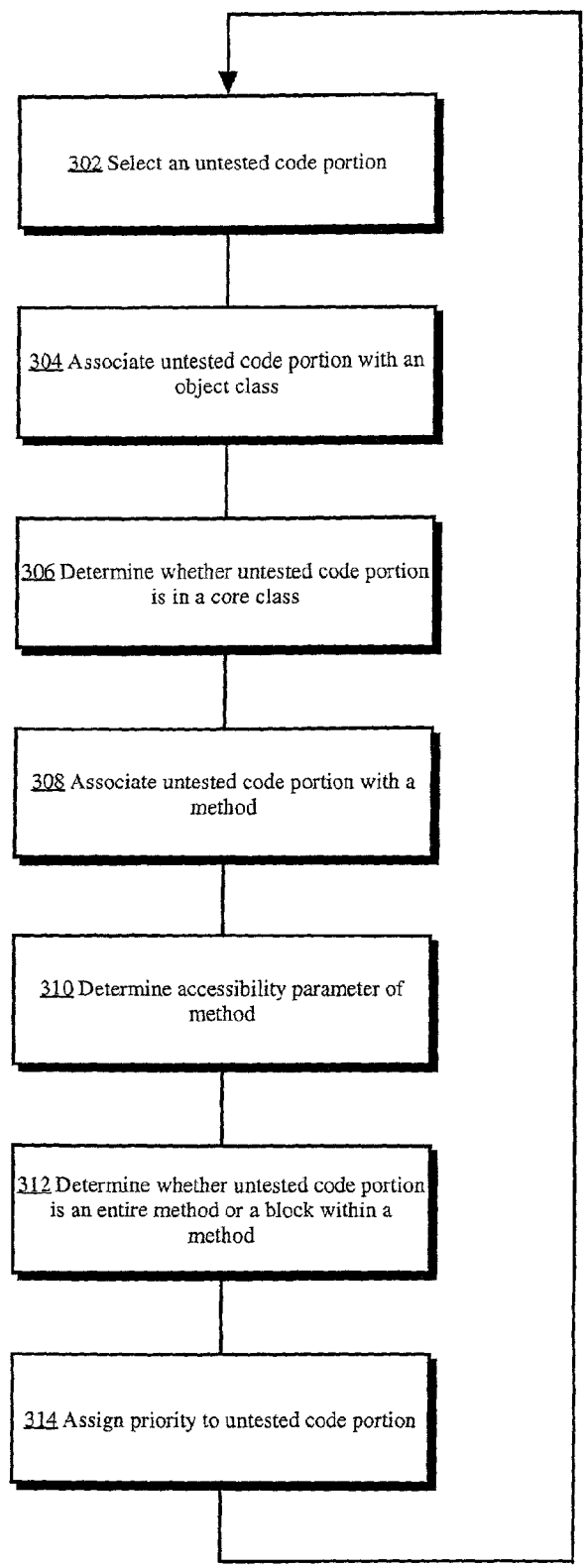
FIG. 3 is a flow diagram illustrating a method for efficiently testing a body of code in accordance with one embodiment of the present invention.

According to one embodiment of the present invention, the untested portions from a body of code are sorted into priorities based upon their functional role within the body of code. FIG. 3 is a flow diagram illustrating a method for prioritizing untested code portions in accordance with one embodiment of the present invention. Initially, a code coverage analyzer generates information indicating what lines of source code have been tested and what lines have not been tested. Thereafter, in step 302, a code portion that is determined by coverage analysis to have not been tested is selected. The untested code portion is placed in a ranking based on how frequently the untested code portion is likely to be invoked during normal operation. In step 304, the untested code portion is associated with an object class. In step 306, it is determined in which of the portions (i.e., core portion 102, implementation portion 104 or application portion 106) the object class belongs. The higher in the hierarchy the untested portion belongs, the higher priority the untested portion will be assigned. For example, if the untested portion belongs in the core portion 102, it is assigned a higher priority. If the untested portion belongs in the implementation portion 104 or application portion 106, it is assigned a lower priority.

In step 308, it is determined in which method the untested portion belongs. Thereafter, in step 310, the accessibility parameter (such as private, public, protected or package visible) of the method is determined. As explained further below, priority of the untested portion is based partially on the accessibility parameter of the method. For example, if the accessibility parameter is public, the untested portion will be assigned a higher priority. If the accessibility parameter is private, the untested portion will be assigned a lower priority.

In Java, the accessibility parameter determines what other methods and object classes may access a method. The four levels of accessibility are public, protected, private and package visible. A public method can be invoked by any method in any object class. A protected method can be invoked by any method in the object class in which it is defined or any subclasses of that object class. The most restrictive accessibility parameter is private. A private method can only be invoked by other methods in the class in which it is defined. This is used when the method provides behavior that is specific to the class. This level includes variables that contain information that if accessed by an outsider, could jeopardize the state of the object or the program in which it is running. Finally, a package visible method is effectively public to all other classes within the same package, but private to classes external to the package.

In one embodiment, in order to minimize the number of priority levels, the private and package visible accessibility parameters are grouped into the same category, and the public and protected accessibility parameters are grouped into the same category.

In step 312, it is determined whether the untested code portion is an entire method or a block within a method. If the untested portion is an entire method, it is assigned a higher priority. If the untested portion is a block within a method, it is assigned a lower priority. In one embodiment, an untested code portion is considered an entire method if the method is not invoked at all during execution. If the method is executed but the untested code portion is just not reached, then the untested code portion is considered a block within the method. This may occur, for example, when a method is invoked but a condition within the method is not reached. Based on the above parameters, a priority is assigned (314) to the untested code portion.

As a sample illustration, the untested code portion may be assigned one of the following eight priorities:

| Priority | Untested Code Portion |
|---|---|
| 1 | Core API classes and their public or protected methods |
| 2 | Blocks in the public or protected methods of Core API classes |
| 3 | Core API classes and their non-public methods |
| 4 | Blocks in the non-public methods of Core API classes |
| 5 | Non-core API classes and their public or protected methods |
| 6 | Blocks in the public or protected methods of non-core API classes |
| 7 | Non-core API classes and their non-public methods |
| 8 | Blocks in the non-public methods of non-core APT classes |

As shown in the above table, the prioritizer 210 assigns the highest priority to an untested code portion if it is located in the core portion 102, the accessibility parameter is public or protected, and the entire method has not been tested. Such a code portion has the most potential impact on the overall body of code. The prioritizer 210 assigns a lower priority (priority 2) to an untested portion if it is located in the core portion 102, the accessibility parameter is public or protected, and the untested portion is just a block within a method.

The prioritizer 210 assigns lower priorities (priorities 3 and 4) to the untested portion if the untested portion is in a method that is non-public (i.e., private or package visible). A public method can be invoked by any method in any object class, and a private method can only be invoked by other methods in the class in which it is defined. Therefore, a non-public method will generally be invoked less frequently in normal operation. Hence, it is given a lower priority.

In one embodiment, a priority 3 is assigned to an untested portion if it is located in the core portion 102, the accessibility parameter is private or package visible, and if the code portion represents an entire method. A priority 4 is assigned if the untested code portion is located in the core portion 102, the accessibility parameter is private or package visible, and the code portion is just a block within a method.

The prioritizer 210 assigns lower priorities (priorities 5, 6, 7 and 8) to untested portions which are not located in the core portion 102, because untested portions in the implementation portion 104 and application portion 106 have less potential impact on the overall body of code than untested portions in the core portion 102. The prioritizer 210 assigns priority 5 to an untested code portion if the code portion is not in the core portion 102, if the accessibility parameter is public or protected, and if the entire method has not been tested. The prioritizer 210 assigns an even lower priority (priority 6) to an untested portion if the code portion is not in the core portion 102, if the accessibility parameter is public or protected, and if the code portion is just a block within a method.

Finally, the prioritizer 210 assigns the lowest priorities (priority 7 and 8) to an untested portion which is not located in the core portion 102 and which has an accessibility parameter that is non-public. In priority 7, the entire method has not been tested, and in priority 8, only a block within the method has not been tested. These untested portions are assigned the lowest priorities because they have the least overall impact on the body of code.

In one embodiment, as illustrated in FIG. 3, a loop continues until all untested portions have been prioritized. Given this prioritized information, a testing team is able to determine which tests to create to derive the greatest benefit for each testing effort. A testing team can develop new tests for untested portions which are assigned higher priorities by the untested code prioritizer 210. As a result, these tests may also test many untested portions which are assigned lower priorities. Therefore, a higher coverage percentage is reached, and overall testing efficiency and effectiveness is greatly improved.

Hardware Overview

Figure 4:
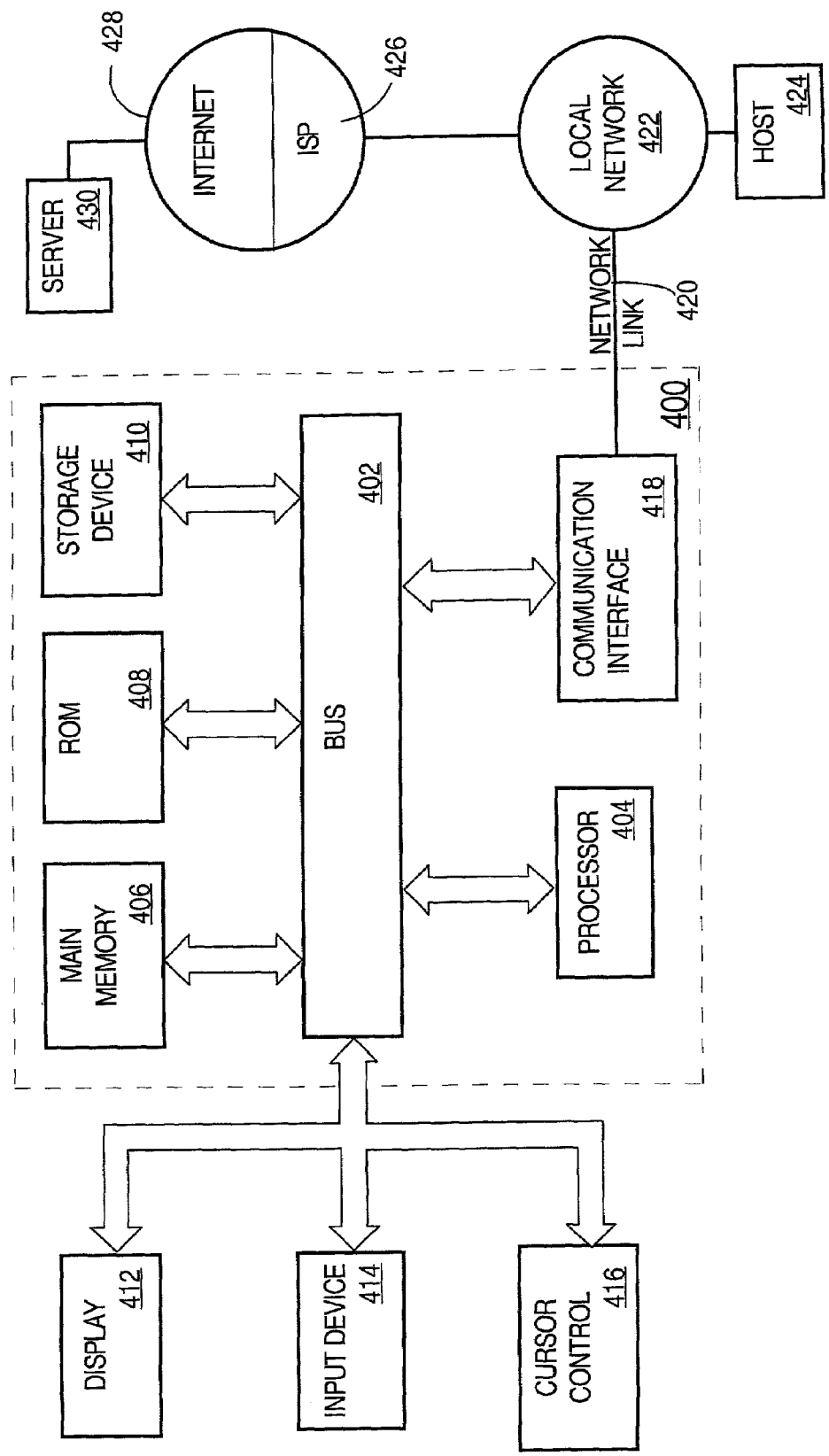
FIG. 4 is a hardware block diagram of a computer system in which one embodiment of the present invention may be implemented.

In one embodiment, the various components 202, 204, 206, 208 and 210 of the present invention are implemented as sets of instructions executable by one or more processors. The invention may be implemented as part of an object oriented programming system, including but not limited to the JAVA™ programming system manufactured by Sun Microsystems, Inc. of Palo Alto, Calif. FIG. 4 shows a hardware block diagram of a computer system 400 in which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 may also be further used to store temporary variables or other intermediate information during execution of instructions by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

According to one embodiment, the functionality of the present invention is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A method, comprising:

determining which code portions within a body of code have not been tested;

selecting a particular untested code portion; and assigning a testing priority to said particular untested code portion, wherein said testing priority is usable to determine whether to produce additional test code to test said particular untested code portion, and wherein assigning said testing priority comprises:

determining whether said particular untested code portion is part of a core portion of said body of code that is likely to be invoked by many other code portions;

in response to a determination that said particular untested code portion is part of a core portion of said body of code, assigning said particular untested code portion a higher priority; and in response to a determination that said particular untested code portion is not part of a core portion of said body of code, assigning said particular untested code portion a lower priority;

wherein determining whether said particular untested code portion is part of a core portion of said body of code comprises:

associating said particular untested code portion with an object class; and determining whether said object class is a core object class within said body of code.

2. The method of claim 1, wherein determining which code portions within said body of code have not been tested comprises:
  putting said body of code through one or more tests;
  deriving one or more sets of test results; and
  analyzing said test results to determine which code portions have not been tested.

3. The method of claim 1, wherein assigning said testing priority further comprises:
  associating said particular untested code portion with a method of said object class; and
  determining an accessibility parameter for said method.

4. The method of claim 3, wherein said particular untested code portion is assigned a higher priority if said accessibility parameter indicates that said method is a public method, and assigned a lower priority if said accessibility parameter indicates that said method is a private method.

5. The method of claim 1, wherein assigning said testing priority to said particular untested code portion further comprises:
  determining whether said particular untested code portion represents an entire method of said object class or a block within a method of said object class; and
  wherein said particular untested code portion is assigned a higher priority if said particular untested code portion represents an entire method, and assigned a lower priority if said particular untested code portion represents a block within a method.

6. A computer-readable storage medium, comprising:
  instructions for causing one or more processors to determine which code portions within a body of code have not been tested;
  instructions for causing one or more processors to select a particular untested code portion; and
  instructions for causing one or more processors to assign a testing priority to said particular untested code portion, wherein the instructions for causing one or more processors to assign said testing priority comprises:
    instructions for causing one or more processors to determine whether said particular untested code portion is part of a core portion of said body of code that is likely to be invoked by many other code portions;
    instructions for causing one or more processors to assign, in response to a determination that said particular untested code portion is part of a core portion of said body of code, said particular untested code portion a higher priority; and
    instructions for causing one or more processors to assign, in response to a determination that said particular untested code portion is not part of a core portion of said body of code, said particular untested code portion a lower priority;
  wherein the instructions for causing one or more processors to determine whether said particular untested code portion is part of a core portion of said body of code comprises:
    instructions for causing one or more processors to associate said particular untested code portion with an object class; and
    instructions for causing one or more processors to determine whether said object class is a core object class within said body of code.

7. The computer-readable storage medium of claim 6, wherein the instructions for causing one or more processors to determine which code portions within said body of code have not been tested comprises:
  instructions for causing one or more processors to put said body of code through one or more tests;
  instructions for causing one or more processors to derive one or more sets of test results; and
  instructions for causing one or more processors to analyze said test results to determine which code portions have not been tested.

8. The computer-readable storage medium of claim 6, wherein the instructions for causing one or more processors to assign said testing priority further comprises:
  instructions for causing one or more processors to associate said particular untested code portion with a method of said object class; and
  instructions for causing one or more processors to determine an accessibility parameter for said method.

9. The computer-readable storage medium of claim 8, wherein said particular untested code portion is assigned a higher priority if said accessibility parameter indicates that said method is a public method, and assigned a lower priority if said accessibility parameter indicates that said method is a private method.

10. The computer-readable storage medium of claim 6, wherein the instructions for causing one or more processors to assign said testing priority to said particular untested code portion further comprises:
  instructions for causing one or more processors to determine whether said particular untested code portion represents an entire method of said object class or a block within a method of said object class; and
  wherein said particular untested code portion is assigned a higher priority if said particular untested code portion represents an entire method, and assigned a lower priority if said particular untested code portion represents a block within a method.

* * * * *